(12) United States Patent
Van Hillo et al.

(10) Patent No.: US 11,109,598 B2
(45) Date of Patent: Sep. 7, 2021

(54) APPARATUS AND METHOD FOR HARVESTING MEAT FROM POULTRY THIGHS

(71) Applicant: Meyn Food Processing Technology B.V., Oostzaan (NL)

(72) Inventors: Eric Adriaan Van Hillo, Oostzaan (NL); Bas Nagel, Oostzaan (NL)

(73) Assignee: Meyn Food Processing Technology B.V., Oostzaan (NL)

(*) Notice: Subject to any disclaimer, the term of this patent is extended or adjusted under 35 U.S.C. 154(b) by 0 days.

(21) Appl. No.: 16/824,103

(22) Filed: Mar. 19, 2020

(65) Prior Publication Data

US 2020/0305449 A1    Oct. 1, 2020

(30) Foreign Application Priority Data

Mar. 25, 2019 (NL) ..................... 2022799

(51) Int. Cl.
*A22C 21/00* (2006.01)

(52) U.S. Cl.
CPC ...... *A22C 21/0076* (2013.01); *A22C 21/0007* (2013.01); *A22C 21/0023* (2013.01); *A22C 21/0092* (2013.01)

(58) Field of Classification Search
CPC ............ A22C 21/0076; A22C 21/0007; A22C 21/0023; A22C 21/0092
USPC ....................... 452/125, 135, 136
See application file for complete search history.

(56) References Cited

U.S. PATENT DOCUMENTS

| 5,186,680 A | 2/1993 | Conaway et al. |
| 5,297,984 A * | 3/1994 | Gagliardi, Jr. ..... A22C 21/0076 426/518 |
| 5,401,210 A * | 3/1995 | Manmoto .......... A22C 21/0076 452/127 |
| 5,660,583 A * | 8/1997 | Roberts ................ A22C 17/004 452/136 |
| 7,993,113 B2 * | 8/2011 | Namiki ................. F16F 15/085 417/363 |

(Continued)

FOREIGN PATENT DOCUMENTS

| EP | 0442554 | 8/1991 |
| EP | 2329721 | 6/2011 |
| JP | 2013255471 A | 12/2013 |

OTHER PUBLICATIONS

International Search Report for Netherlands Application No. 2022799 dated Mar. 25, 2019, 12 pages.

(Continued)

*Primary Examiner* — Richard T Price, Jr.
(74) *Attorney, Agent, or Firm* — Dority & Manning, P.A.

(57) ABSTRACT

Apparatus and method for harvesting meat from poultry thighs in a processing line provided with carriers for poultry legs. A cutter for cutting into the poultry leg, and a scraper for scraping poultry thigh meat from the thighbone, wherein the scraper of the apparatus is arranged to clamp the poultry leg near to its knee joint and fix the knee joint in position, and the cutter is arranged to provide a first cut into the poultry leg while the scraper clamps the poultry leg, and wherein the cutter is arranged to provide the cut adjacent to the scraper and below the knee joint at the height of a knuckle of the thighbone at the side of the knee joint, so as to cut through ligaments that connect the thigh meat to the thighbone.

15 Claims, 6 Drawing Sheets

(56) References Cited

U.S. PATENT DOCUMENTS

| | | |
|---|---|---|
| 9,326,527 B2 | 5/2016 | Kido et al. |
| 2008/0020693 A1* | 1/2008 | Toyoshima ........ A22C 21/0084 452/135 |
| 2014/0120815 A1* | 5/2014 | Stooker .............. A22C 21/0076 452/125 |
| 2015/0250193 A1* | 9/2015 | Kido .................. A22C 21/0076 452/135 |

OTHER PUBLICATIONS

English Translation of Japanese Office Action Corresponding to Application No. 2020053479 dated Mar. 16, 2021.

* cited by examiner

APPARATUS AND METHOD FOR HARVESTING MEAT FROM POULTRY THIGHS

PRIORITY STATEMENT

The present application claims priority under 35 U.S.C. § 119 to Dutch patent application No. 2022799, filed Mar. 25, 2019.

FIELD OF THE INVENTION

The subject matter of the present disclosure relates generally to an apparatus and method for harvesting meat from poultry thighs.

BACKGROUND OF THE INVENTION

EP-B-3 157 344 discloses an apparatus and method for harvesting meat from poultry thighs in a processing line provided with carriers for poultry legs, wherein each carrier is arranged to convey a poultry leg suspended at its ankle joint, the leg including a drumstick, a knee joint and a poultry thigh with a thighbone. This known apparatus includes a cutter for cutting into the poultry leg, in particular into the knee-joint, and includes a scraper for scraping poultry thigh meat from the thighbone. For this purpose, the apparatus of EP-B-3 157 344 further applies a pusher to push the thighbone out of the poultry thigh through an aperture of the scraper. The cut that is provided in the knee joint is therefore indispensable, since this enables that the poultry leg is bended, after which bending operation the removal of the bone from the poultry thigh can be executed. All in all, the known apparatus is quite a complicated piece of machinery, which is also exemplified by the extensive length of the patent document EP-B-3 157 344.

U.S. Pat. No. 9,326,527 B2 also discloses an apparatus and method for harvesting meat from poultry thighs in a processing line.

BRIEF DESCRIPTION OF THE INVENTION

It is an exemplary object of the invention to provide a less complicated apparatus and method for harvesting meat from poultry thighs.

It is also an exemplary object of the invention to provide such an apparatus and method, that provides a high yield of meat, which is also of high quality.

It is a further exemplary object of the invention to provide such an apparatus and method which is suitable for application in a high rate processing line.

In an exemplary embodiment, an apparatus and method for harvesting meat from poultry thighs in a processing line is provided with carriers for poultry legs, wherein each carrier is arranged to convey a poultry leg suspended at its ankle joint, the leg including a drumstick, a knee joint and a poultry thigh with a thighbone. The apparatus further includes a cutter for cutting into the poultry leg, and a scraper for scraping poultry thigh meat from the thighbone. A step of clamping the poultry leg near to its knee joint is applied to fix the knee joint in position, and to provide a first cut into the poultry leg while the poultry leg is thus clamped in position, wherein the cut is provided below the knee joint at the height of a knuckle of the thighbone which is at the side of the knee joint, so as to cut through tendons that connect the thigh meat to the bone. Further the scraper has at least two scraping modes including a first scraping mode and a second scraping mode, wherein the first scraping mode is arranged to execute an initial scraping action on the thighbone below the knee joint, which initial scraping action extends over a predetermined part of the poultry thigh below the knee joint which remains distant from a hip joint of the thighbone. In an exemplary aspect of the invention, the scraper is arranged to execute the initial scraping mode after releasing the clamping action on the poultry leg.

In an exemplary aspect, the cutter is a circumferential cutter to arrange that the cut is approximating a circular cut around the poultry leg. This promotes the subsequent harvesting of the poultry thigh meat.

For this exemplary embodiment, the apparatus may be further provided with a deskinner. Advantageously the deskinner is arranged to become operational after the cutter has provided the cut into the poultry leg below the knee joint at the height of the knuckle of the thighbone at a side of the knee joint.

The cutter may be arranged to provide a second cut into the poultry leg adjacent to the scraper at a predetermined distance from the knee joint. Desirably the second cut is provided into the poultry leg at a predetermined distance from the knee joint which is farther away from the knee joint than the first cut.

The second cut can be provided after completion of the initial scraping mode, wherein the second cut is provided adjacent to the scraper being distant from the hip joint of the thighbone, i.e. in its eventual position reached after completion of the initial scraping mode over the predetermined section of the poultry thigh.

The thigh meat may be scraped in a second scraping mode over the entire length of the thighbone, preferably taking place after the second cut.

The scraper may be arranged to move to a position near to the knee joint prior to executing the second scraping mode of the scraper.

After completion of the second scraping mode the scraped meat may be cut loose from the thighbone.

In an exemplary aspect, the apparatus of the invention may be preferably embodied such that the second scraping mode of the scraper is arranged to be operational after the first scraping mode.

The scraper may be arranged to execute the second scraping mode of the scraper after the cutter has provided the second cut into the poultry leg. The scraper may be arranged to scrape the thigh meat in the second scraping mode over the entire length of the thighbone.

Suitably further the cutter of the apparatus, or an additional knife of the apparatus, may be arranged to cut loose the scraped meat from the thighbone.

In another exemplary embodiment, the present invention provides an apparatus for harvesting meat from poultry thighs in a processing line provided with carriers for poultry legs, wherein each carrier is arranged to convey a poultry leg suspended at its ankle joint, the poultry leg including a drumstick, a knee joint and a poultry thigh with a thighbone. The apparatus can include a cutter for cutting into the poultry leg, and a scraper for scraping poultry thigh meat from the thighbone, wherein the scraper of the apparatus can be arranged to clamp the poultry leg near to its knee joint and to fix the knee joint in position, and the cutter can be arranged to provide a first cut into the poultry leg while the scraper clamps the poultry leg. The cutter can be arranged to provide the first cut adjacent to the scraper and below the knee joint at the height of a knuckle of the thighbone closest to the knee joint so as to cut through tendons that connect the thigh meat to the thighbone.

The apparatus can be provided with a deskinner. The deskinner may be arranged to become operational after the cutter has provided the first cut into the poultry leg. The scraper may be provided with at least two scraping modes including a first scraping mode and a second scraping mode. The first scraping mode may be arranged to execute an initial scraping mode on the thighbone below the knee joint. The initial scraping mode extends over a predetermined section of the poultry thigh below the knee joint that remains distant from a hip joint of the thighbone. The initial scraping mode may be arranged to start at the position of the first cut. The scraper may be arranged to execute the initial scraping mode after releasing the clamping mode on the poultry leg.

The cutter may be arranged to provide a second cut into the poultry leg adjacent to the scraper at a predetermined distance from the knee joint. The cutter may be arranged to provide the second cut after completion of the initial scraping mode of the scraper, wherein the second cut is provided adjacent to the scraper being distant from the hip joint of the thighbone in its eventual position reached after completion of the initial scraping mode over the predetermined section of the poultry thigh. The second scraping mode of the scraper may be arranged to be operational after the first scraping mode. The scraper may be arranged to scrape the thigh meat in the second scraping mode over the entire length of the thighbone. The second scraping mode of the scraper may be initiated after the cutter has provided the second cut into the poultry leg. The scraper may be arranged to move to a position near to the knee joint prior to executing the second scraping mode of the scraper. The cutter of the apparatus, or an additional knife of the apparatus may be arranged to cut loose the scraped meat from the thighbone.

The present invention also provides and exemplary method for harvesting meat from poultry thighs in a processing line, wherein poultry legs are conveyed while being suspended at their ankle joints, each of said poultry legs comprising a drumstick, a knee joint and a poultry thigh with a thighbone. The exemplary method may include cutting into the poultry leg and scraping of poultry thigh meat from the thighbone by a scraper. The method may include clamping the poultry leg by the scraper near to its knee joint to fix the knee joint in position, and providing a first cut into the poultry leg while the poultry leg is thus clamped in position, wherein the cut is provided below the knee joint at the height of a knuckle of the thighbone which is present at a side of the knee joint, so as to cut through tendons that connect the thigh meat to the thighbone. The poultry thigh may be deskinned. The deskinning may be done after providing the cut into the poultry leg below the knee joint at the height of the knuckle of the thighbone at the side of the knee joint.

For this exemplary method, an action of an initial scraping mode may be executed on the thighbone below the knee joint, which initial scraping mode may extend over a predetermined part of the poultry thigh below the knee joint which remains distant from a hip joint of the thighbone. A second cut may be provided into the poultry leg at a predetermined distance from the knee joint which is farther away from the knee joint than the first cut. A second cut may be provided after completion of the initial scraping mode. The thigh meat may be scraped in a second scraping mode over the entire length of the thighbone. The second scraping mode may be initiated after providing the second cut into the poultry leg. After completion of the second scraping mode, the scraped meat may be cut loose from the thighbone.

These and other objects and advantages are provided by an apparatus and method according to the invention which has the features of one or more of the appended claims.

BRIEF DESCRIPTION OF THE DRAWINGS

The invention will hereinafter be further elucidated with reference to a drawing of a non-limiting exemplary embodiment of the apparatus and a method of its use in accordance with the invention.

In the drawing of FIGS. 1-9 the subsequent steps of an exemplary method of the invention are depicted as executed with an exemplary embodiment of the apparatus of the invention, wherein.

Whenever in the figures the same reference numerals are applied, these numerals refer to the same parts.

DETAILED DESCRIPTION OF THE INVENTION

For purposes of describing the invention, reference now will be made in detail to embodiments and/or methods of the invention, one or more examples of which are illustrated in or with the drawings. Each example is provided by way of explanation of the invention, not limitation of the invention. In fact, it will be apparent to those skilled in the art that various modifications and variations can be made in the present invention without departing from the scope or spirit of the invention. For instance, features or steps illustrated or described as part of one embodiment, can be used with another embodiment or steps to yield a still further embodiments or methods. Thus, it is intended that the present invention covers such modifications and variations as come within the scope of the appended claims and their equivalents.

It is common knowledge that in general (live) poultry includes not only legs but also a neck, a head and a bill.

Figure 1B:
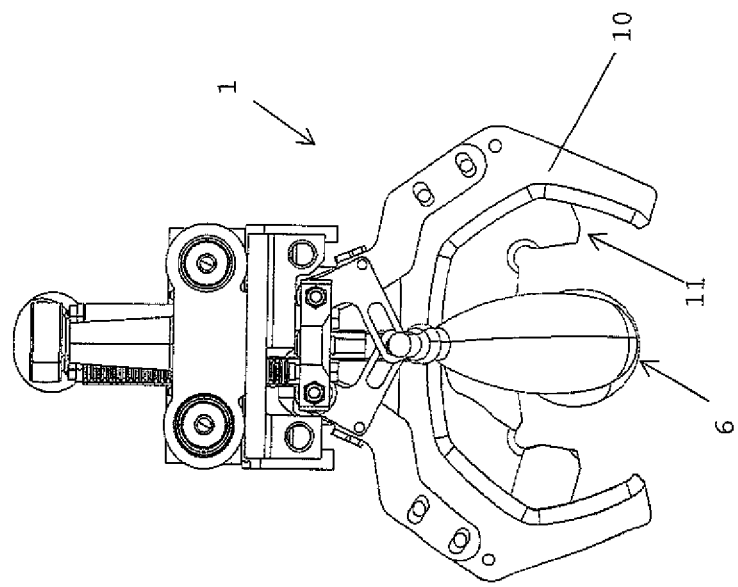
FIGS. 1A and 1B show an exemplary apparatus of the invention in a side view and top view, respectively.
Figure 1A:
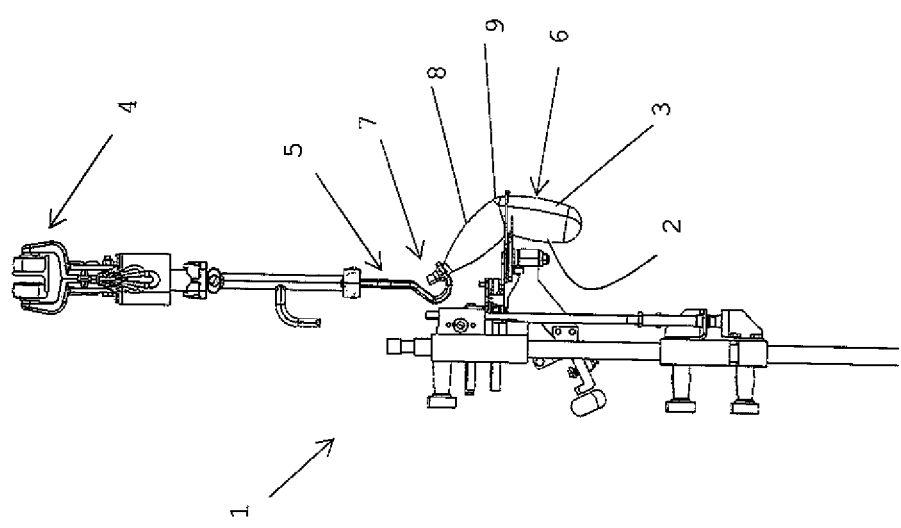

Referring first to FIG. 1A, it shows an exemplary apparatus 1 for harvesting meat 2 from poultry thighs 3 in a processing line 4 provided with carriers 5 for poultry legs 6, wherein each carrier 5 is arranged to convey a poultry leg 6 suspended at its ankle joint 7. As the expert (and the layman) knows the poultry leg 6 includes a drumstick 8, a knee joint 9 and a poultry thigh 3 with a thighbone 3' (the thighbone being visible in for instance FIG. 4).

FIG. 1B shows that the apparatus 1 includes a cutter 10 for cutting into the poultry leg 6, and a scraper 11 for scraping poultry thigh meat 2 from the thighbone 3'. The cutter 10 is preferably arranged to make a complete or nearly complete circumferential cut into the poultry leg 6.

Figure 2C:
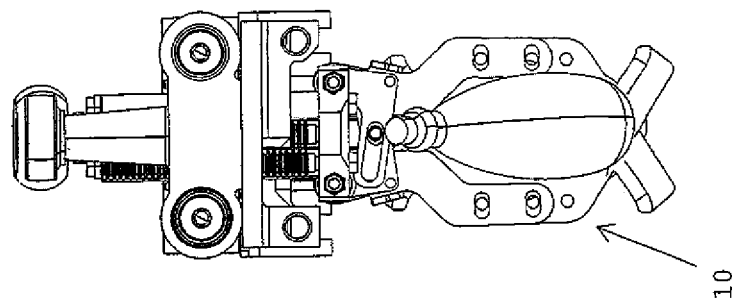
FIGS. 2A-2C show an exemplary apparatus of the invention in a top view showing subsequent steps of operation.
Figure 2B:
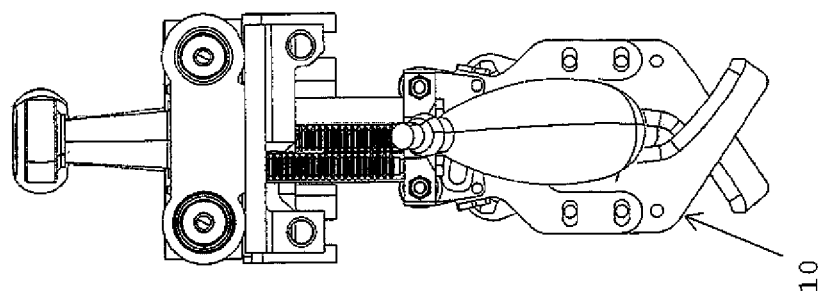
Figure 2A:
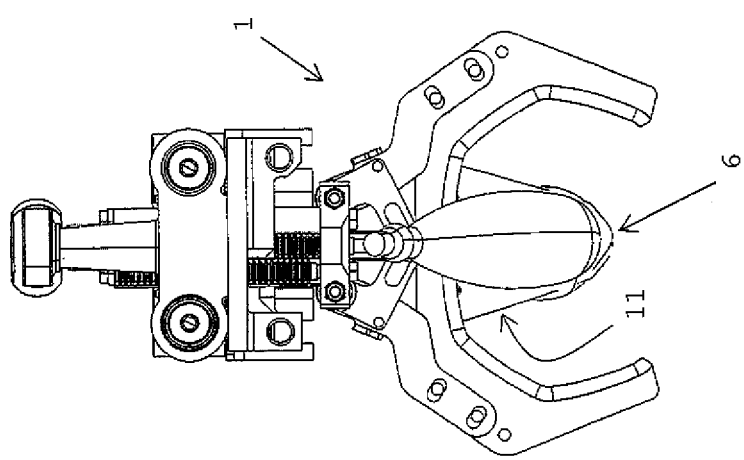

The apparatus 1 can be provided with a separate clamp, however this embodiment is not shown. In the shown embodiment, instead of a separate clamp, the scraper 11 of the apparatus 1 is arranged to clamp the poultry leg 6 near to its knee joint 9 (see FIGS. 1A and 2A) and thus fix the knee joint 9 in position. FIGS. 2B and 2C show the cutting action following the clamping action on the poultry leg 6, in which the cutter 10 is arranged to subsequently provide a first cut into the poultry leg 6 while the scraper 11 clamps the poultry leg 6 and keeps it in position. The cutter 10 is thus arranged to provide the (approximately circumferential) cut adjacent to the scraper 11 and below the knee joint 9 at the height of a knuckle of the thighbone 3', which knuckle is present at the side of the knee joint 9, so as to cut through tendons that—as the expert knows—connect the thigh meat 2 to the bone.

Figure 3:
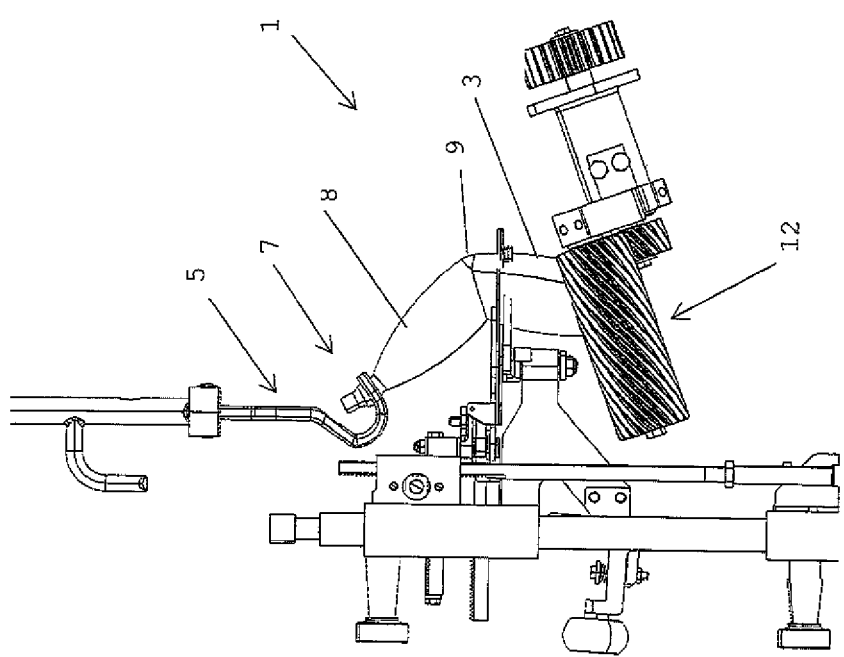
FIG. 3 shows an exemplary deskinner of the apparatus of the invention.

FIG. 3 shows that the apparatus 1 is further pro-vided with a deskinner 12. The deskinner 12 is arranged to become operational after the cutter 10 has provided the first cut into the poultry leg 6 below the knee joint 9 at the height of the knuckle of the thighbone which is present at the side of the knee joint 9, as explained above with reference to FIGS. 2B and 2C.

Figure 4:
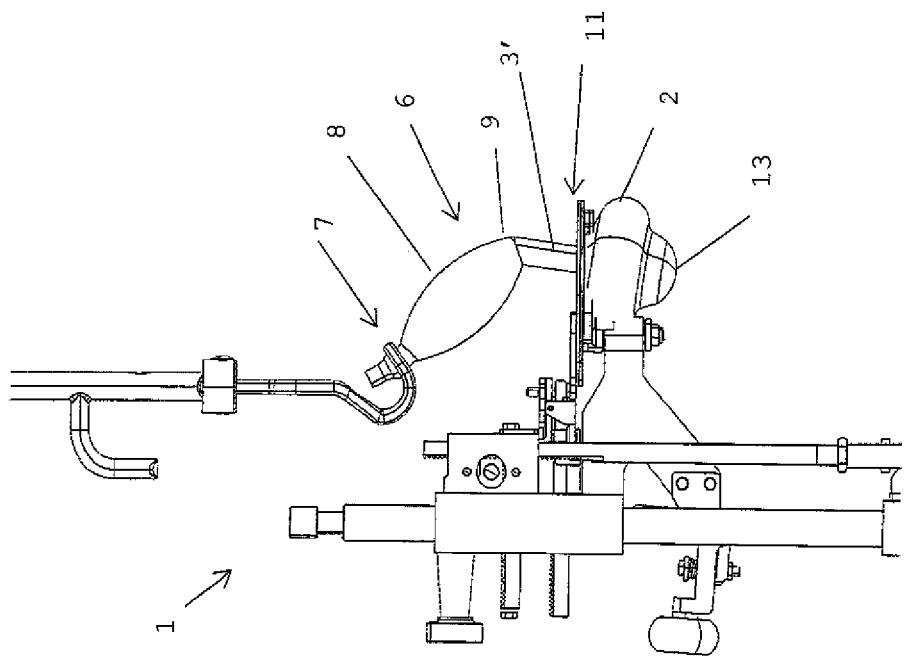
FIG. 4 shows an exemplary initial scraping mode of the apparatus of the invention.

FIG. 4 shows that after deskinning the scraper 11 becomes operational in a first scraping mode, which acts on the thighbone 3' below the knee joint 9, and which initial scraping mode extends over a predetermined section of the poultry thigh 3 below the knee joint 9, wherein the action of the scraping mode remains distant from a hip joint 13 of the thighbone 3'. When a separate clamp is used in addition to the scraper 11, the clamp can remain in position, however in the shown embodiment the scraper 11 is used as a clamp. In that situation it is preferred that the exemplary scraper 11 is arranged to execute the initial scraping mode after releasing the clamping action on the poultry leg 6.

Figure 5B:
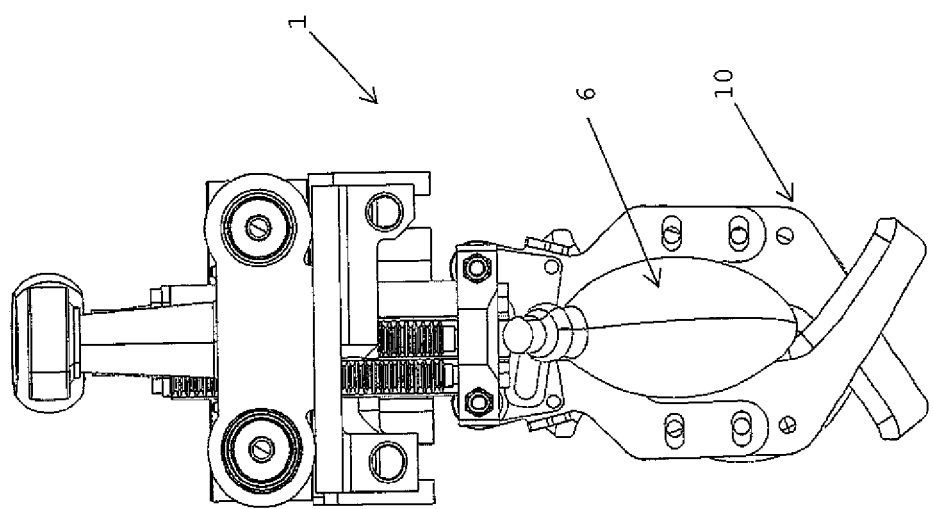
FIGS. 5A and 5B show an exemplary second cutting mode of the apparatus of the invention in a side view and top view, respectively.
Figure 5A:
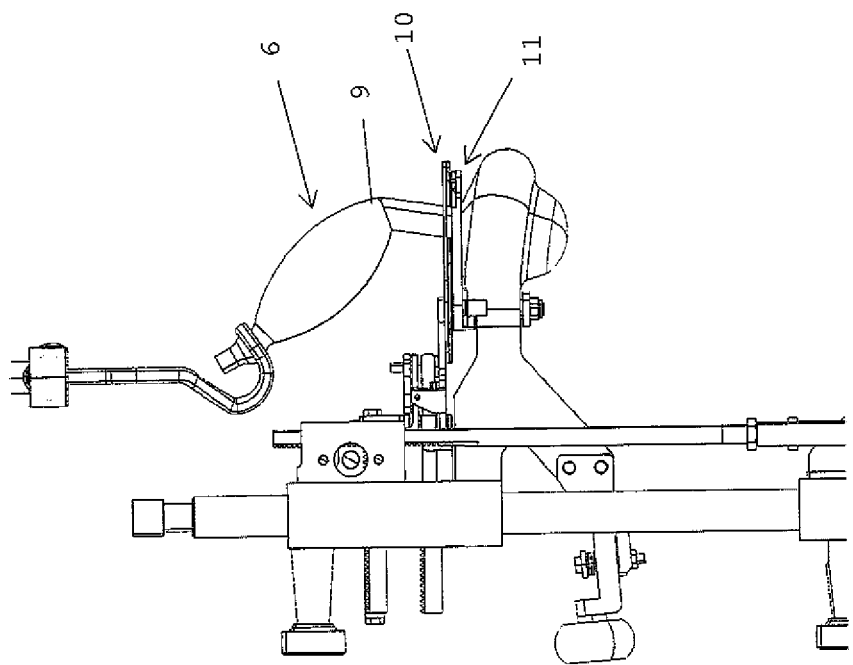

FIGS. 5A and 5B show inside view and top view, respectively that the cutter 10 is arranged to provide a second cut into the poultry leg 6 adjacent to the scraper 11 at a predetermined distance from the knee joint 9. In the shown exemplary embodiment, the cutter 10 is arranged to provide the second cut after completion of the initial scraping mode of the scraper 11 which is shown in FIG. 4. The second cut is then provided adjacent to the scraper 11 still being distant from the hip joint 13 of the thighbone 3' in the eventual position the scraper 11 has reached after completion of the initial scraping mode over the predetermined section of the poultry thigh.

Figure 7:
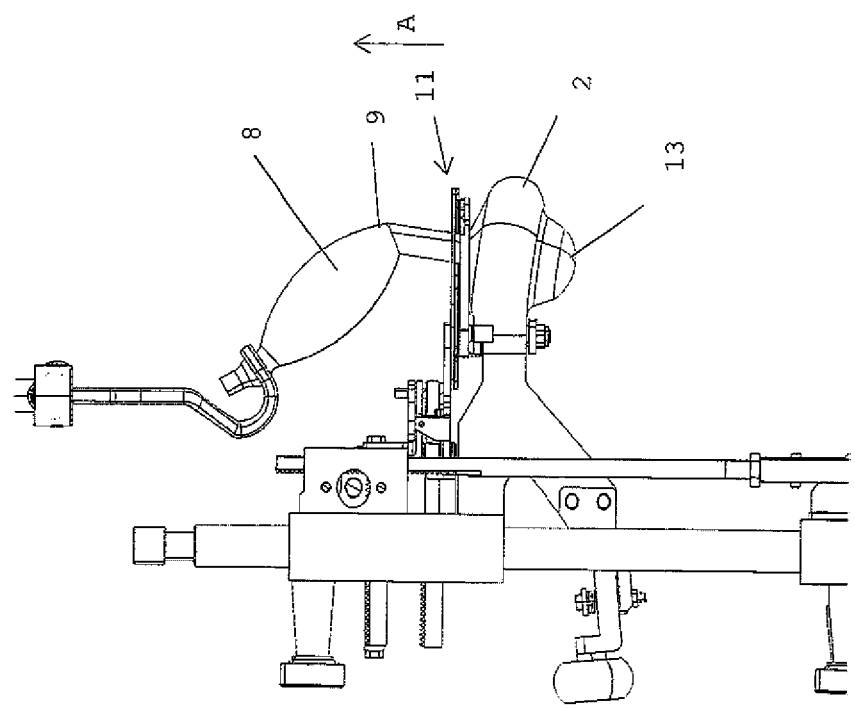
FIGS. 6 and 7 show respectively opening and upward moving of the exemplary scraper of the apparatus of the invention.
Figure 6:
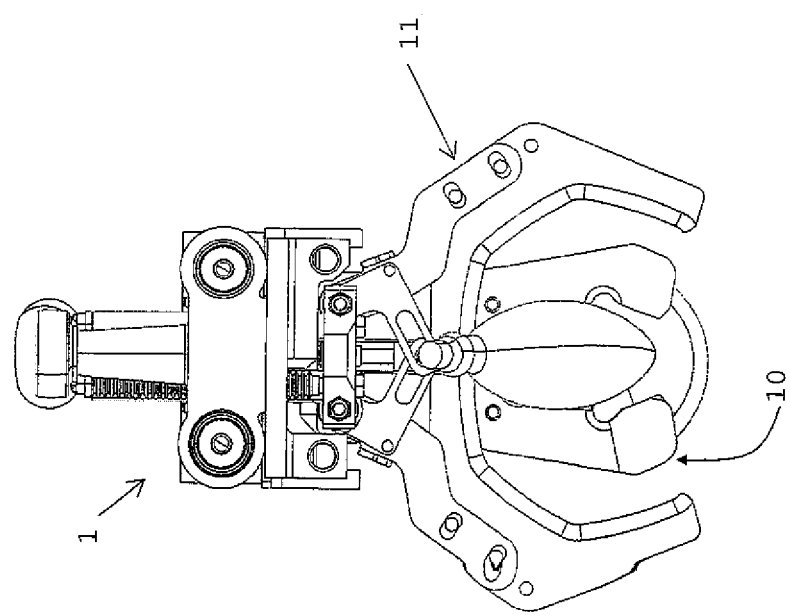
Figure 8:
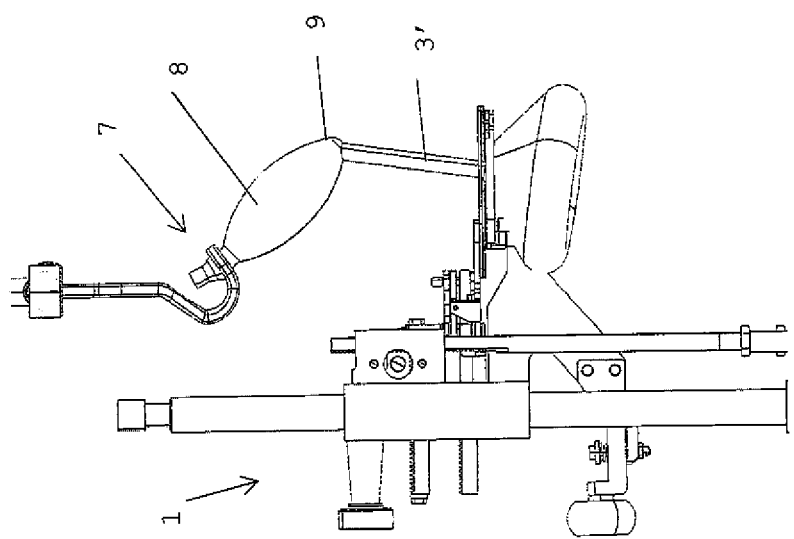
FIG. 8 shows an exemplary final scraping operation of the scraper of the exemplary apparatus of the invention.

The scraper 11 is further embodied with a second scraping mode which is arranged to be operational after the first scraping mode and after the cutter 10 has provided the second cut into the poultry leg 6 as shown in FIGS. 5A and 5B. The scraper 11 is arranged to then first open and release the poultry leg 6 as is shown in FIG. 6, and as FIG. 7 shows to subsequently move upwards according to arrow A to a position near to the knee joint 9 prior to executing the second scraping mode of the scraper 11. FIG. 8 then depicts the final scraping mode in which the scraper 11 is arranged to scrape the thigh meat in the second scraping mode over the entire length of the thighbone 3'.

Figure 9:
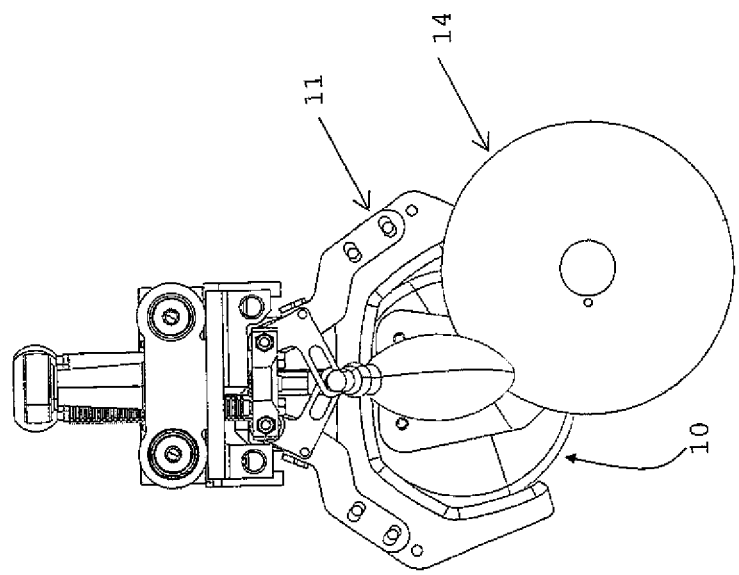
FIG. 9 shows cutting loose of the scraped meat that is scraped loose from the thighbone with the exemplary apparatus of the invention.

FIG. 9 finally shows that after completion of the final scraping mode according to FIG. 8, a knife 14 of the apparatus 1 is arranged to cut loose the scraped meat from the thighbone 3'. Cutting loose of the meat after the scraping action can also be done by use of the cutter 10.

Although the invention has been discussed in the foregoing with reference to an exemplary embodiment of the method and apparatus of the invention, the invention is not restricted to this particular embodiment which can be varied in many ways without departing from the invention. The dis-cussed exemplary embodiment shall therefore not be used to construe the appended claims strictly in accordance therewith. On the contrary the embodiment is merely intended to explain the wording of the appended claims without intent to limit the claims to this exemplary embodiment. The scope of protection of the invention shall therefore be construed in accordance with the appended claims only, wherein a possible ambiguity in the wording of the claims shall be resolved using this exemplary embodiment.

The invention claimed is:

1. An apparatus for harvesting meat from poultry thighs in a processing line provided with carriers for poultry legs, wherein each carrier is arranged to convey a poultry leg suspended at its ankle joint, the poultry leg comprising a drumstick, a knee joint and a poultry thigh with a thighbone, the apparatus comprising:
   a cutter for cutting into the poultry leg;
   a scraper for scraping poultry thigh meat from the thighbone, wherein the scraper of the apparatus is arranged to clamp the poultry leg near to its knee joint and to fix the knee joint in position, and the cutter is arranged to provide a first cut into the poultry leg while the scraper clamps the poultry leg;
   wherein the cutter is arranged to provide the first cut adjacent to the scraper and below the knee joint at the height of a knuckle of the thighbone closest to the knee joint, so as to cut through tendons that connect the thigh meat to the thighbone;
   wherein the scraper is provided with at least two scraping modes comprising a first scraping mode and a second scraping mode, wherein the first scraping mode is arranged to execute an initial scraping mode on the thighbone below the knee joint, which initial scraping mode extends over a predetermined section of the poultry thigh below the knee joint that remains distant from a hip joint of the thighbone, and wherein the initial scraping mode is arranged to start at the position of the first cut, the scraper arranged to execute the initial scraping mode after releasing the clamping mode on the poultry leg.

2. The apparatus according to claim 1, wherein the apparatus is provided with a deskinner.

3. The apparatus according to claim 2, wherein the deskinner is arranged to become operational after the cutter has provided the first cut into the poultry leg.

4. The apparatus according to claim 1, wherein the cutter is arranged to provide a second cut into the poultry leg adjacent to the scraper at a predetermined distance from the knee joint.

5. The apparatus according to claim 4, wherein the cutter is arranged to provide the second cut after completion of the initial scraping mode of the scraper, wherein the second cut is provided adjacent to the scraper being distant from the hip joint of the thighbone in its eventual position reached after completion of the initial scraping mode over the predetermined section of the poultry thigh.

6. The apparatus according to claim 1, wherein the second scraping mode of the scraper is arranged to be operational after the first scraping mode and preferably after the cutter has provided the second cut into the poultry leg.

7. The apparatus according to claim 6, wherein the scraper is arranged to scrape the thigh meat in the second scraping mode over the entire length of the thighbone.

8. The apparatus according to claim 7, wherein the scraper is arranged to move to a position near to the knee joint prior to executing the second scraping mode of the scraper.

9. A method for harvesting meat from poultry thighs in a processing line, wherein poultry legs are conveyed while being suspended at their ankle joints, each of the poultry legs comprising a drumstick, a knee joint and a poultry thigh with a thighbone, the method comprising:

cutting into the poultry leg;

scraping of poultry thigh meat from the thighbone by a scraper;

clamping the poultry leg by the scraper near to its knee joint to fix the knee joint in position, and providing a first cut into the poultry leg while the poultry leg is thus clamped in position, wherein the cut is provided below the knee joint at the height of a knuckle of the thighbone that is present at a side of the knee joint, so as to cut through tendons that connect the thigh meat to the thighbone, wherein an initial scraping mode is executed on the thighbone below the knee joint, which initial scraping mode extends over a predetermined part of the poultry thigh below the knee joint that remains distant from a hip joint of the thighbone, wherein the initial scraping mode is executed after releasing the clamping mode on the poultry leg.

10. The method according to claim 9, wherein the poultry thigh is deskinned.

11. The method according to claim 10, wherein the deskinning is done after providing the cut into the poultry leg below the knee joint at the height of the knuckle of the thighbone at the side of the knee joint.

12. The method according claim 9, wherein a second cut is provided into the poultry leg at a predetermined distance from the knee joint that is farther away from the knee joint than the first cut.

13. The method according to claim 9, wherein the second cut is provided after completion of the initial scraping mode.

14. The method according to claim 13, wherein the thigh meat is scraped in a second scraping mode over the entire length of the thighbone.

15. The method according to claim 14, wherein the second scraping mode is initiated after providing the second cut into the poultry leg.

* * * * *